United States Patent [19]
Johannsen

[11] 3,867,238

[45] Feb. 18, 1975

[54] FLEXILE CORE MATERIAL FOR LAMINATED STRUCTURES AND METHOD OF PRODUCING THE SAME

[75] Inventor: Thomas J. Johannsen, Toronto, Ontario, Canada

[73] Assignee: Chemacryl Plastics Limited, Toronto, Ontario, Canada

[22] Filed: Mar. 6, 1973

[21] Appl. No.: 338,538

[30] Foreign Application Priority Data
Apr. 18, 1972 Canada ............................... 140061

[52] U.S. Cl. ................... 161/37, 156/258, 156/259, 161/121
[51] Int. Cl. ............................................. B32b 3/16
[58] Field of Search ........ 117/4, 8; 161/36, 37, 117, 161/121, 123, 159, 160; 156/257, 259, 268; 83/30, 51, 678, 688, 691, 695

[56] References Cited
UNITED STATES PATENTS

| | | | |
|---|---|---|---|
| 1,967,444 | 7/1934 | Lowe | 161/117 |
| 2,768,924 | 10/1956 | Wright | 156/257 |
| 2,785,739 | 3/1957 | McGregor | 117/8 X |
| 3,042,562 | 7/1962 | Peterson | 161/123 X |
| 3,106,983 | 10/1963 | Karpovich | 161/117 X |
| 3,285,768 | 11/1966 | Habib | 117/161 X |
| 3,397,106 | 8/1968 | Moseley | 161/159 X |
| 3,495,487 | 2/1970 | Miner | 83/678 X |
| 3,520,220 | 7/1970 | Acker | 83/695 X |
| 3,591,443 | 7/1971 | Cox | 161/117 X |
| 3,764,450 | 10/1973 | Tesch | 161/117 X |

*Primary Examiner*—William E. Schulz
*Attorney, Agent, or Firm*—Ridout & Maybee

[57] ABSTRACT

A flexile core material for laminated structures consists of a sheet of rigid elastic foam plastic material, said sheet being slotted on one side to define an array of contiguous, discrete, rectangular block-like elements which are articulately interconnected by hinge pieces constituted by unslotted portions of the sheet on the other side thereof.

13 Claims, 8 Drawing Figures

FLEXILE CORE MATERIAL FOR LAMINATED STRUCTURES AND METHOD OF PRODUCING THE SAME

This invention relates to a flexible core material for laminated structures and to a process for producing such a material.

A core material in accordance with the invention is primarily intended for use in the manufacture of laminated structures of the type in which a foam core is sandwiched between a pair of rigid skins. Laminated panel structures of this type are commonly formed in the construction of boat hulls, the hulls being moulded by handlay-up and the core being bonded to the skins while pressure is maintained. With the core materials that are presently available it is difficult to ensure that the skins are uniformly bonded to the core over its whole area, owing to the complex countour of the mould in which the panel structure is shaped, and to obtain a uniform bond expensive pressing equipment designed for a particular panel shape and size, is required. Furthermore, the resilience of the core material is such that the bonding pressure must be applied throughout the curing stage in order that the core should not return to its original shape.

It is an object of the present invention to provide a flexile core material for laminated structures of the above-mentioned type, which material is easily accommodated to the contour of the mould and is relatively non-resilient so that the maintenance of bonding pressure during the curing stage is unnecessary.

A flexile core material according to the invention consists of a sheet of rigid elastic foam plastic material, said sheet being slotted on one side to define an array of contiguous, discrete, rectangular block-like elements which are articulately interconnected by hinge pieces constituted by unslotted portions of the sheet. By "rigid elastic foam plastic material" is meant a closed cell plastic foam material having a compressive strength of at least 25 p.s.i. and being compressible at 20°C to 50% of its original thickness without rupture of the cell structure, the material being recoverable to its original shape when the compressive force is removed. The foam plastic material must have some elasticity, as it is important that the hinge pieces should not be brittle; the material may be pure polyvinyl chloride foam (for example the foam plastic material sold under the trade mark "Airex") which material is especially suitable for such a purpose.

Core materials in accordance with the invention, and a process for producing the same, will now be described by way of example with reference to the accompanying drawings, in which.

Figure 1:
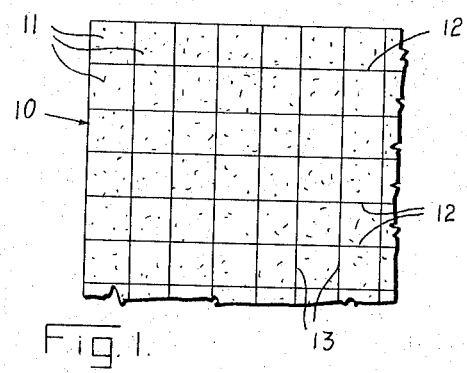
FIG. 1 is a fragmentary view of one side of a first core material.
Figure 6:
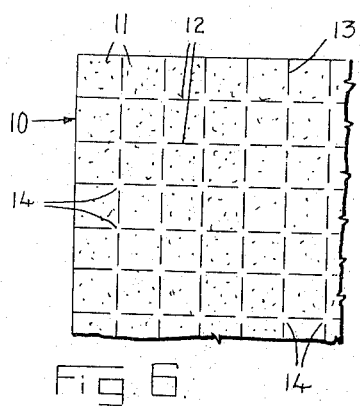
FIG. 6 is a fragmentary view, corresponding to FIG. 2, of one side of a second core material according to the invention.
Figure 7:
FIG. 7 is a fragmentary view, corresponding to FIG. 2, of one side of a third core material according to the invention.

The reverse sides of the materials shown in FIGS. 6 and 7 are exactly as shown in FIG. 1.

Figure 2:
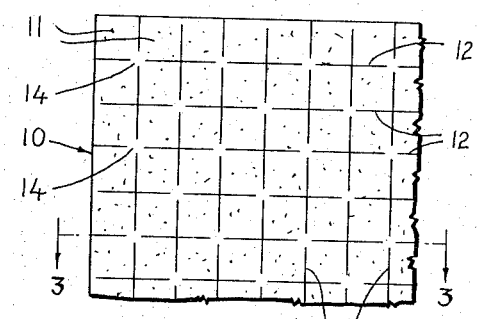
FIG. 2 is a fragmentary view of the other side of the core material.
Figure 3:
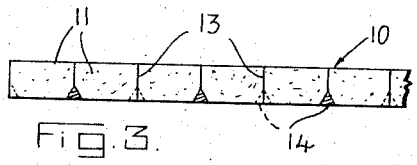
FIG. 3 is a section on line 3—3 in FIG. 2.

Referring to FIGS. 1, 2 and 3, a sheet of rigid elastic foam plastic material 10, such as pure polyvinyl chloride foam, has a pair of opposite sides which are shown in FIGS. 1 and 2 respectively. The sheet is slotted on one side (i.e. the side shown in FIG. 1) to define an array of contiguous, discrete, square block-like elements 11. The elements 11 are separated from one another by longitudinally extending slots 12 and transverse slots 13. The slots 12 and 13, which are continuous on said one side of the sheet, open into the other side of the sheet shown in FIG. 2, but on this other side they are interrupted so as to leave unslotted portions of the sheet as indicated at 14. The unslotted portions 14 on said other side of the sheet constitute hinge pieces by which the block-like elements 11 are articulately interconnected as best shown in FIG. 3. In this particular embodiment of the invention, maximum flexibility of the sheet is obtained by virtue of the fact that each element 11 is connected to its adjacent elements by hinge pieces 14 at one pair of diagonally opposite corners only.

Figure 4:
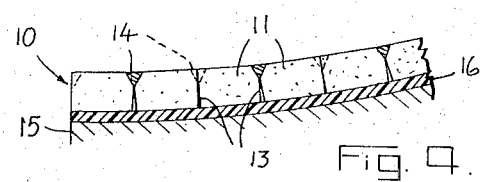
FIG. 4 is a fragmentary sectional view of part of a laminated assembly accommodated to the surface of a mould.

FIG. 4 shows how the core material is accommodated to the surface of a mould, a portion of the mould being shown in section at 15. The first skin 16, which in this case is a thin sheet of impermeable, reinforced plastics material, is first coated with a suitable adhesive, and is placed in the mould so as to line the mould, and the core material 10 is placed in the mould in contact with the skin 16; the hinge pieces 14 enable the block-like elements to assume whatever orientations are necessary so that the core follows the mould contour. There is no tendency for the core material to spring back into its former shape. The second skin (not shown) is next accommodated to the exposed side of the core and bonded thereto, the laminated structure thereafter being set without the application of bonding pressure.

Figure 5:
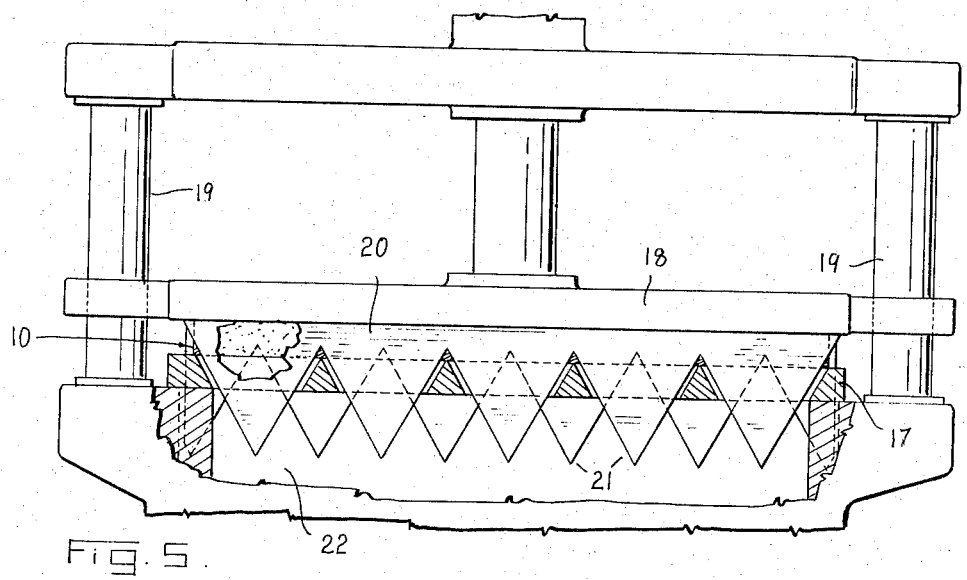
FIG. 5 is a fragmentary view of a knife assembly for use in the production of the core material.

Referring to FIG. 5, the slots 12 and 13 are formed in the sheet of foam material 10 by placing the sheet on platen 17 of a cutting press 18. The cutting press includes a plate 18 which is guided by columns 19 for vertical movement, the plate 18 being raised and lowered by a hydraulic piston (not shown). Projecting vertically downward from the underside of the plate 18 are a plurality of blades 20, each blade providing a row of wedge shaped cutters 21, the cutting edges of which are inclined to the upper side of the sheet 10. (The upper side is the side shown in FIG. 1). The cutters 21 of the respective blades 20 are staggered alternately, as shown in FIG. 5. As the plate 18 is moved downwardly the cutter portions 21 penetrate the core sheet 10 and cut through the sheet to form a series of parallel, equally spaced slots, the cutter portions entering slots 22 in the platen 17. The downward movement of the table is stopped at a predetermined position in which the cutting edges of the cutters 21 intersect the lower surface of the core sheet 10 so as to leave uncut portions 14. In this position the plate 18 bears on the upper side of the sheet, thus ensuring that the slots extend for the full thickness of the sheet except at the portions 14. When the cutters have been withdrawn the sheet is turned through 90° and the slotting operation is repeated. In this case a series of slots intersecting the first series of slots at right angles is formed, leaving cruciform uncut portions which will constitute the hinge pieces 14. The resultant configuration of the hinge pieces will be as shown in FIG. 2.

By suitably modifying the configuration of the hinge pieces 14 can be obtained. For example, if the cutters 21 of the respective blades 20 are aligned instead of being alternately staggered, the resultant configuration of hinge pieces is as shown in FIG. 6. In this case, each of the block-like elements 11 is articulately connected to its adjacent elements by hinge pieces at four corners. Alternatively, by arranging for the transverse slots in the core to be formed by two sets of alternate blades in which the cutter portions of one set are spaced by twice the distance of the cutter portions of the other set, the configuration shown in FIG. 7 can be obtained. In this configuration, each block-like element 11 is connected to its adjacent elements by hinge pieces 14, which are disposed at the mid-point of one side of the element and at the two corners defined by the other three sides.

Figure 8:
FIG. 8 is a sectional view, corresponding to FIG. 3, of a fourth core material according to the invention.

FIG. 8 shows a core material consisting of a sheet of pure polyvinyl chloride foam 10'. The sheet is slotted on each side to define an array of contiguous, discrete, square block-like elements 11'. The configuration of the slots on each side of the sheet 10' is the same as the configuration shown in FIG. 1. The section shown in FIG. 8 is taken through one of the longitudinal slots (corresponding to the slots 12 of FIG. 1), the transverse slots being shown at 13'. It will be seen that the hinge pieces 14', constituted by unslotted portions of the sheet, are of diamond cross section, and lie midway between the opposite sides of the sheet. The block-like elements 11' are articulately interconnected by these hinge pieces so that the sheet has sufficient flexibility to be draped over the surface of a mould. The advantage of this particular configuration is that the sheet will readily conform to a surface of convex, concave, or wavy contour.

The invention thus provides a core material which is rendered flexile by being divided into an array of rectangular elements which are articulately interconnected, each element being supported at two, three or four points.

What I claim as my invention is:

1. A flexile core material for laminated structures comprising a sheet of rigid elastic foam plastic material, said sheet being provided with a plurality of intersecting, rectilinear, slots defining an array of contiguous discrete, polygonal blocklike elements, each element being articulately connected to its adjacent elements by hingepieces constituted by unslotted portions of said material, each slot extending for the full thickness of the sheet save at regularly spaced locations at which it extends for less than the full thickness to define said unslotted portions.

2. A flexible core material according to claim 1, wherein the block-like elements are rectangular.

3. A flexile core material according to claim 2, wherein the block-like elements are square.

4. A flexile core material according to claim 2, wherein each block-like element is connected to its adjacent elements at its corners only.

5. A flexile core material according to claim 4, wherein each block-like element is connected to its adjacent elements by hingepieces disposed at one pair of diagonally opposite corners only.

6. A flexile core material according to claim 4, wherein the block-like elements are square.

7. A flexile core material according to claim 2, wherein each block-like element is connected to its adjacent elements by three hingepieces disposed respectively at the midpoint of one of its sides and at the corners defined by its other sides.

8. A flexile core material according to claim 1, in which the hingepieces are contiguous with one side of the sheet.

9. A flexile core material according to claim 1, in which the hingepieces lie between opposite sides of the sheet.

10. A flexile core material for laminated structures consisting of a sheet of rigid elastic foam plastic material, said sheet being provided with a plurality of intersecting slots extending from one side of the sheet for the full thickness of the sheet to define an array of contiguous discrete, rectangular block-like elements, said slots extending continuously over said one side of the sheet and being interrupted at intervals on the other side of the sheet to define a plurality of discrete hingepieces by which the block-like elements are articulately interconnected.

11. A flexile core material according to claim 10, wherein each block-like element is so connected to its adjacent elements at its corners only.

12. A flexile core material according to claim 11, wherein each block-like element is so connected to its adjacent elements at one pair of diagonally opposite corners only.

13. A flexile core material according to claim 10, wherein each block-like element is so connected to its adjacent elements at the midpoint of one of its sides and at the corners defined by its other sides.

* * * * *